May 20, 1958   E. L. WOOD   2,835,535
WHEEL TRIM AND METHOD OF MANUFACTURING THE SAME
Filed Oct. 22, 1954   4 Sheets-Sheet 1

INVENTOR.
EDWARD L. WOOD
BY
ATTORNEY

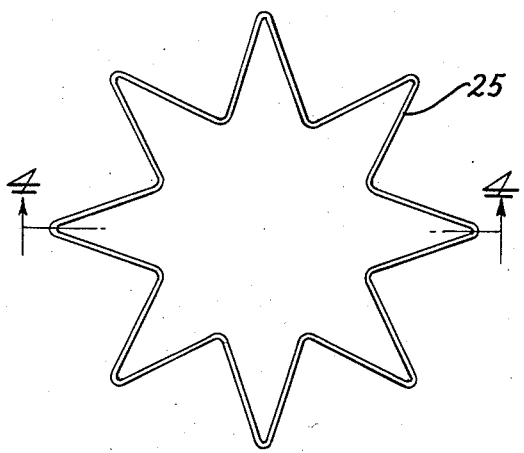
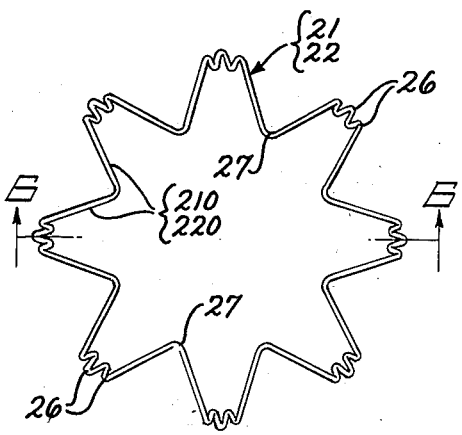
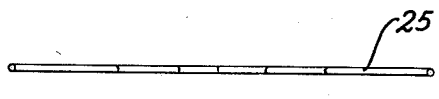
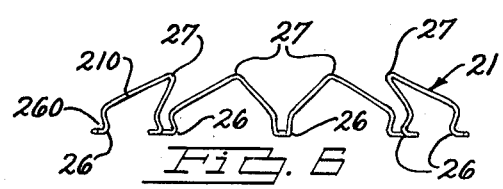
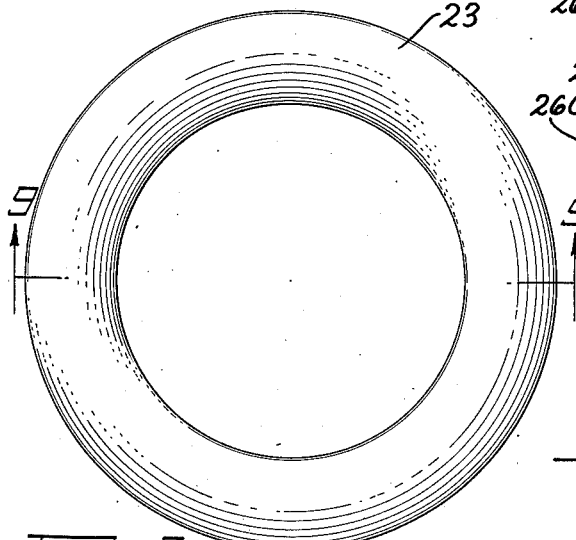
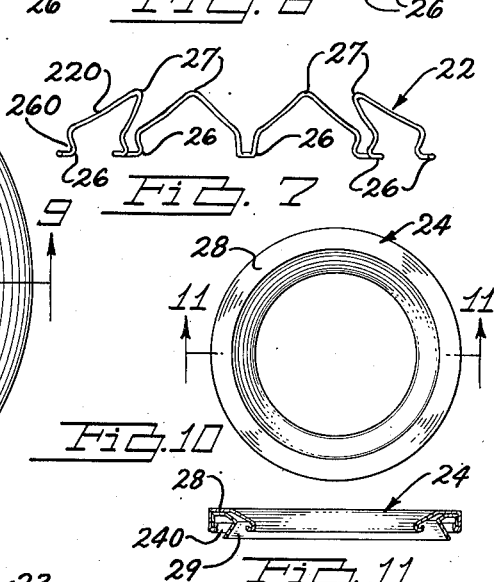
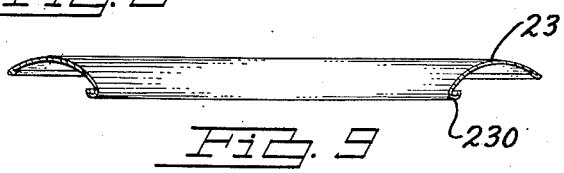

May 20, 1958 E. L. WOOD 2,835,535
WHEEL TRIM AND METHOD OF MANUFACTURING THE SAME
Filed Oct. 22, 1954 4 Sheets-Sheet 3
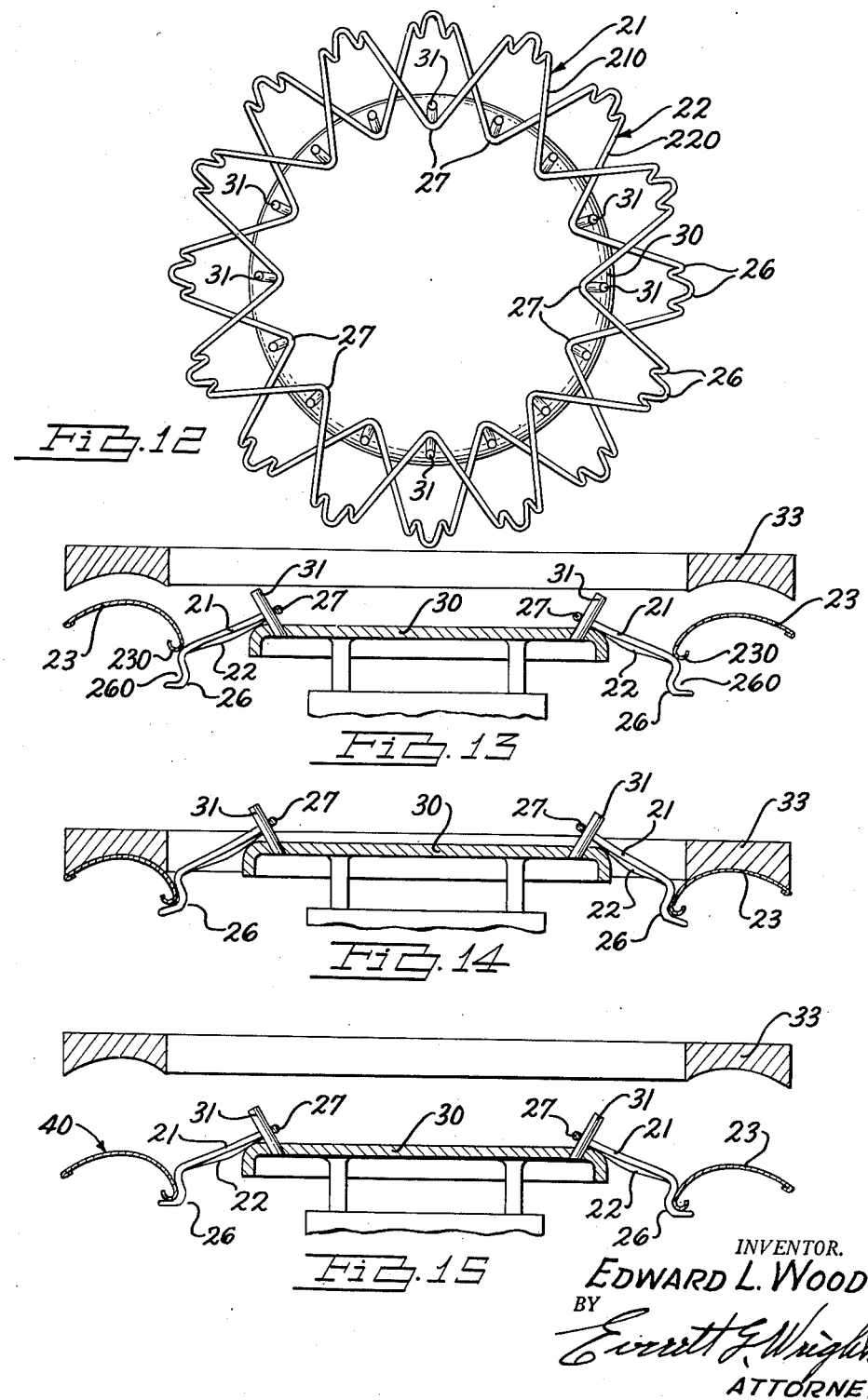
INVENTOR.
EDWARD L. WOOD
BY
Everett G. Wright
ATTORNEY May 20, 1958
E. L. WOOD
2,835,535
WHEEL TRIM AND METHOD OF MANUFACTURING THE SAME
Filed Oct. 22, 1954
4 Sheets-Sheet 4
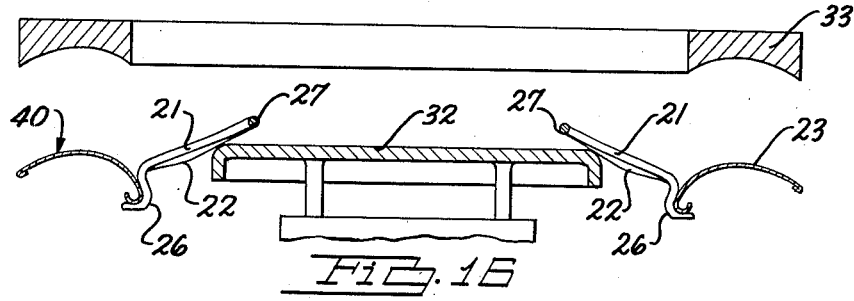
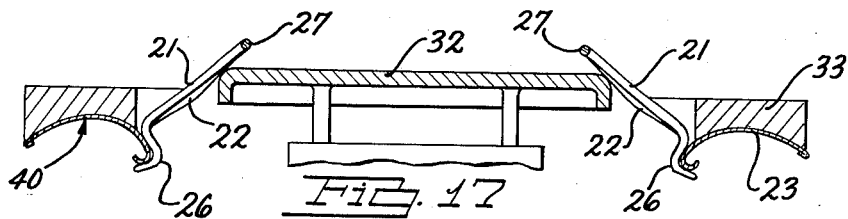
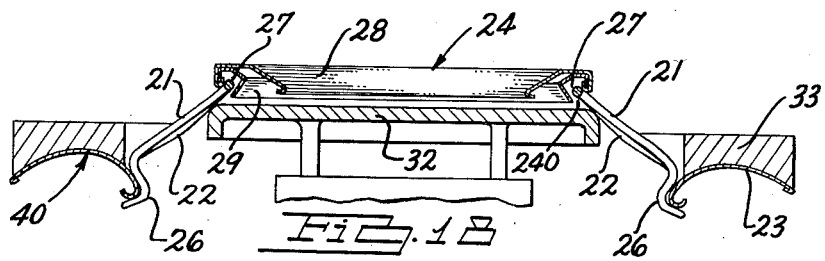
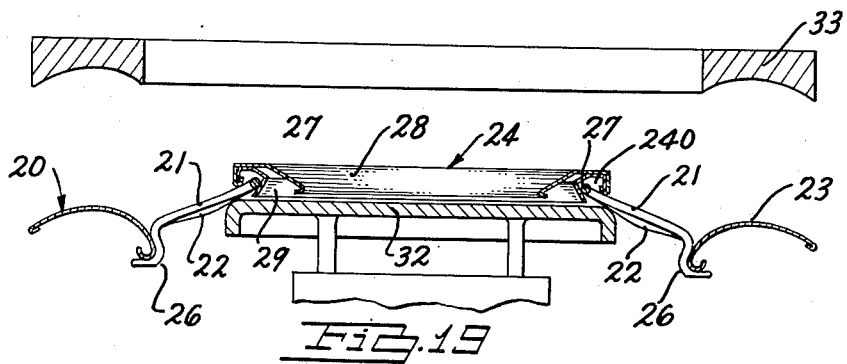
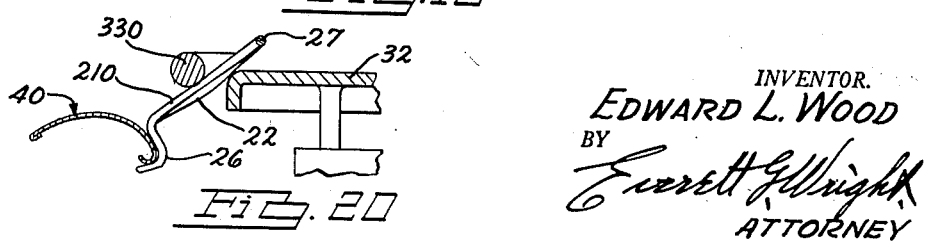
INVENTOR.
EDWARD L. WOOD
BY
*Everett G. Wright*
ATTORNEY United States Patent Office 2,835,535
Patented May 20, 1958

2,835,535

WHEEL TRIM AND METHOD OF MANUFACTURING THE SAME

Edward L. Wood, Detroit, Mich., assignor, by direct and mesne assignments, to Gar Wood Industries, Inc., a corporation of Michigan Application October 22, 1954, Serial No. 464,113

15 Claims. (Cl. 301—37)

This invention relates to improved wire wheel simulating wheel trim for vehicle wheels and an improved method of manufacturing the same, and this application constitutes a continuation in part of my copending application, Serial No. 343,853, filed March 23, 1953, now abandoned.

In the prior art there have been many and various forms of wire wheel simulating wheel trim for use on vehicle wheels of the disc or substantially solid spider type; however, such wheel trim structures have been of complicated construction, necessitating the use of complex welding operations and expensive fixtures, and require a considerable amount of labor to produce. As a result, wire wheel simulating wheel trim has heretofore been so expensive to manufacture that the consumer price thereof has been beyond the reach of the average motorist.

With the foregoing in view, the primary object of the invention is to provide an improved wire wheel simulating wheel trim which is constructed of relatively few simple elements that may be assembled into a completed wheel trim unit without welding and which are held and maintained in their completed assembled relationship solely by the employment of spring reaction between the several elements thereof.

Another object of the invention is to provide an improved method of manufacturing wire wheel simulating wheel trim units which is simple and efficient and which provides a sturdy assembly without the use of securing means such as welding or the like.

Other objects of the invention will become apparent by reference to the following detailed description taken in connection with the accompanying drawings, in which:

Fig. 3 is a plan view of an eight pointed star shaped wire blank from which the spoke elements employed to serve as spokes for wheel trim units embodying the invention are formed.

Fig. 4 is a side elevational view of the star shaped blank disclosed in Fig. 3.

Fig. 5 is a plan view showing how the apices of the star shaped wire blanks disclosed in Fig. 3 are hooked to form star shaped spoke elements for spring engagement with the wheel ring element employed as a part of the wheel trim unit.

Fig. 6 is a side elevational view of the shape to which one of the star shaped spoke elements is formed to serve as spokes for the wire wheel simulating wheel trim units, the spokes per se being straight.

Fig. 7 is a side elevational view of the shape to which the other of the star shaped spoke elements is formed to serve as spokes for the wire wheel simulating wheel trim units, the spoke per se being slightly concaved to underlie the spokes of the other star shaped element in juxtaposition thereto.

Fig. 8 is an elevational view of the wheel ring element employed as a part of the wheel trim unit.

Fig. 9 is a cross sectional view of the wheel ring element taken on the line 9—9 of Fig. 8.

Fig. 10 is a plan view of a central hub element, shown annular in the instant case, which is employed to become spring engaged by and cooperate with the inner apices of the star shaped spoke elements shown in Figs. 3–7 inclusive.

Fig. 11 is a cross sectional view taken on the line 11—11 of Fig. 10.

Fig. 12 is a plan view showing two star shaped spoke elements positioned with one superimposed in staggered relationship over the other on a mandrel having pegs engaging the inner apices of the said star shaped spoke elements holding them ready for the first assembly operation.

Figures 1, 2:
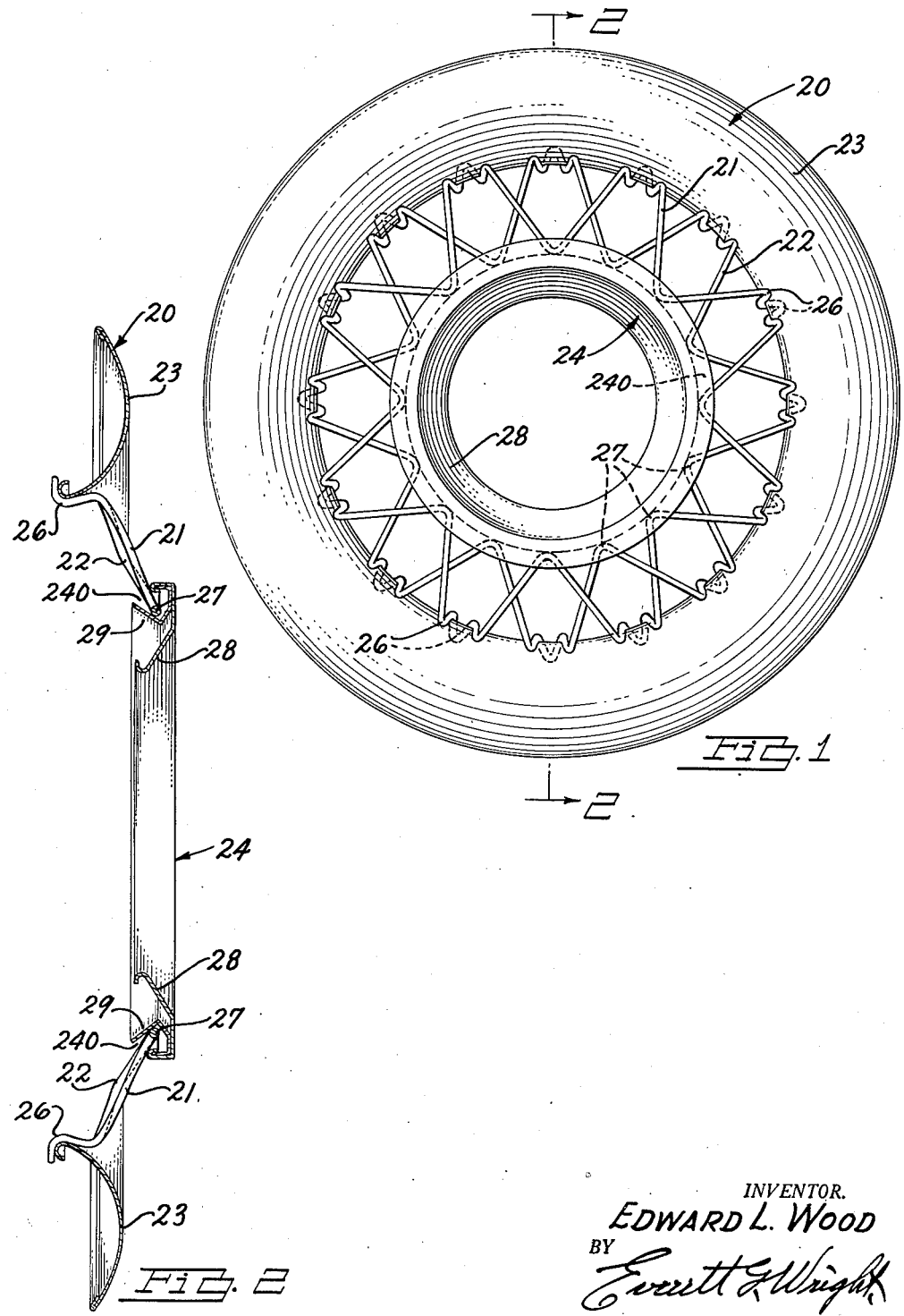
Fig. 1 is an elevational view of a wire wheel simulating wheel trim unit embodying the invention.
Fig. 2 is a vertical sectional view taken on the line 2—2 of Fig. 1.

Fig. 13 is a cross sectional view of the pegged mandrel with the star shaped spoke elements shown in Fig. 12 ready to be sprung into engagement with the wheel ring element, the die employed to spring the star shaped spoke elements within the wheel ring being shown above the wheel ring element ready to contact and center the wheel ring in respect to the star shaped spoke elements and the pegged mandrel.

Fig. 14 is a cross sectional view similar to Fig. 13 except the die has pressed the wheel ring element into interlocked engagement with the star shaped spoke elements.

Fig. 15 is a cross sectional view similar to Fig. 14 except the die has been lifted and the wheel ring-spoke element sub-assembly is ready for removal from the pegged mandrel.

Fig. 16 is a cross sectional view similar to Fig. 15 except that the wheel ring-spoke element sub-assembly has been moved to a smooth mandrel ready for the expansion of the inner apices of the star shaped elements, the die for accomplishing the operation and holding the ring-spoke element sub-assembly central in respect to the mandrel being shown above the wheel ring element.

Fig. 17 is a view similar to Fig. 16 except that the die has moved into contact with the wheel ring element and forced it downwardly whereby to spring the star shaped elements to a greater than normal angle in respect to the plane of the ring element and simultaneously increase the diameter of the apices thereof.

Fig. 18 is a view similar to Fig. 17 except that the central hub element has been positioned onto the diagonally upwardly disposed inner apices of the star shaped elements with the said inner apices of the star shaped elements positioned loosely in the annular re-entrant groove of the said central hub element.

Fig. 19 is a view similar to Fig. 18 except that the die contacting the wheel ring element has been retracted and the star shaped elements have sprung back to their normal angle in respect to the plane of the ring element and have securely engaged the central hub element at the structure defining the annular re-entrant groove thereof, the said wire wheel simulating wheel trim unit being completely assembled and ready for removal from the mandrel.

Fig. 20 is a fragmentary sectional view showing the die employed to assemble wheel trim embodying the invention contacting the spoke elements rather than the wheel ring element.

Referring now to the drawings wherein like numerals refer to like and corresponding parts throughout the several views, the wire wheel simulating wheel trim unit 20 shown for the purpose of illustrating the invention is composed of four elements; namely, two star shaped spoke elements 21 and 22, an annular wheel ring element 23 and a central hub element 24. A completed wire wheel trim simulating unit 20 is shown in Figs 1 and 2. This complete assembly may be secured to the side of a vehicle wheel in any desired manner, but preferably by the means disclosed in my copending applications, Serial No.

343,852, filed March 23, 1953, now Patent No. 2,749,184, dated June 5, 1956, and Serial No. 455,679, filed September 13, 1954, now Patent No. 2,749,185, dated June 5, 1956.

The star shaped spoke elements 21 and 22 are preferably formed from a multipointed star shaped spring wire blank 25 shown in Figs. 3 and 4, the spring wire being stainless steel, or, if desired, the spring wire could be of ordinary spring steel chrome plated or otherwise finished. The star shaped spring wire blank 25 is preferably manufactured by first forming a continuous loop of spring wire and then die forming the loop into a multipointed star shape. The outer apices of the spoke elements 21 and 22 are formed hook shaped at 26 in the manner indicated in Fig. 5 and elsewhere in the drawings, the hooks 26 being provided with a reentrant portion 260. The spokes 210 and 220 of the star shaped spoke elements 21 and 22 respectively are formed on an angle with respect to the plane in which the hooks 26 thereof reside so that they slope upwardly and inwardly from the hooks 26 toward their inner apices 27. The only difference between the star shaped spoke elements 21 and 22 is that the spokes 210 of the spoke element 21 are straight while the spokes 220 of the spoke element 22 are slightly concaved to permit the spoke elements 21 and 22 to nest in staggered relationship as shown in Fig. 12 with the spoke portions 210 and 220 thereof in juxtaposition and with the hooks 26 and inner apices 27 thereof disposed in parallel planes.

The annular wheel ring element 23 may be of any desired shape or cross sectional configuration; however, the inner periphery of the said wheel ring element 23 preferably has a rolled inner peripheral edge 230 to provide the wheel ring with sufficient stiffness to accommodate the spring load of the spoke elements 21 and 22 when sprung thereto. The rolled inner edge 230 of the annular wheel ring element 23 is also preferably shaped to mate with the hooks 26 at the outer apices of the star shaped spoke elements 21 and 22.

The annular central hub element 24 shown in Figs. 10 and 11 is constructed of two pieces, an outer ornamental ring 28 and an inner retainer ring 29. The outer ornamental ring 28 may be of any desired shape and is preferably formed of stainless steel or cold rolled steel chrome plated. The inner retainer ring 29 may be formed of any suitable material and may be secured to the ornamental ring 28 in any suitable manner such as clinching the outer peripheral edge of the ornamental ring 28 around the outer peripheral edge of the retainer ring 29 as indicated in the drawings, or by welding or other securing means. It is essential that the annular central hub element 24 be so constructed as to provide an annular groove 240 at the rear thereof which faces radially outwardly and axially rearwardly to permit the hub element 24 to be freely positioned on the inner apices 27 of the star shaped elements 21 and 22 as shown in Fig. 18 when the slope and internal diameter thereof are increased as shown in Figs. 17 and 18 from their normal attitude as shown in Fig. 16. The said annular groove 240 is also so proportioned that, when the star shaped elements 21 and 22 are permitted to return to their normal smaller internal diameter and normal flatter slope as shown in Fig. 19, the inner apices 27 of the said star shaped spoke elements 21 and 22 engage the hub structure defining the said radially outwardly and axially rearwardly extending annular groove 240. No matter what the shape and detail of the central hub element 24 may be or what form spoke elements 21 and 22 may take, it is essential that the relationship therebetween as hereinabove described or the equivalent thereof be present.

The method of assembling wire wheel simulating wheel trim units embodying the invention comprises the placing of multipointed star shaped spoke elements 21 and 22 on a circular curved edged mandrel 30 with the apices thereof circumferentially staggered with respect to each other and disposed on upwardly and diagonally outwardly extending pegs 31 suitably spaced around the top of the said mandrel near the periphery thereof. The said pegs 31 are of the correct number and are disposed at the proper angle and spacing to receive and hold the star shaped spoke elements 21 and 22 on the mandrel 30 during the springing of the said spoke elements to receive the annular wheel ring element 23. Fig. 13 shows the star shaped spoke elements 21 and 22 properly positioned on the circular mandrel 30 with the inner apices 27 thereof impaled over the mandrel pegs 31 and with the wheel ring element 23 positioned onto the star shaped spoke elements 21 and 22 ready for engagement by an annular die 33 concaved to conform to the shape of the annular wheel ring element 23. Movement of the die 33 from its position shown in Fig. 13 to its position shown in Fig. 14 causes the inner rolled peripheral edge 230 of the annular wheel ring element 23 to depress the outer periphery of the spoke elements 21 and 22 and causes the said inner peripheral edge 230 of the ring element 23 to snap past the upper radially outermost portion of the hooks 26 formed at the outer apices of the spoke elements 21 and 22. The said hooks 26 firmly engage the inner rolled peripheral edge 230 of the annular wheel ring element 23 when the die 33 is retracted to permit the spoke elements 21 and 22 to spring back substantially to their normal attitude, thereby completing the ring-spoke element sub-assembly 40 composed of the star shaped spoke elements 21 and 22 and the ring element 23.

The ring-spoke element sub-assembly 40 composed of a wheel ring element 23 and star shaped spoke elements 21 and 22 interlocked thereto is removed from the pegged mandrel 30 and placed on a plain circular mandrel 32 as shown in Fig. 16, the outer periphery of which is suitably rounded and is of somewhat greater diameter than the diameter normally assumed by the inner apices 27 of the star shaped spoke elements 21 and 22. A die 33 normally disposed above the wheel ring elements 23 of the subassembly 40 as shown in Fig. 16 is moved downwardly as shown in Fig. 17 to depress the wheel ring element 23 in respect to the mandrel 32. This springs the star shaped spoke elements 21 and 22 to a greater than normal angle in respect to the plane of the ring element 23 and simultaneously increases the diameter of the circle of the inner apices 27 of the said star shaped spoke elements 21 and 22.

The central hub member 24 hereinbefore described in detail is now positioned on the diagonally upwardly disposed inner apices 27 of the star shaped elements 21 and 22 with the said apices 27 thereof disposed freely within the radially outwardly and axially inwardly disposed annular groove 240 thereof as shown in Fig. 18, and then the die 33 is retracted as shown in Fig. 19. When the die 33 is retracted, the said star shaped elements 21 and 22 spring back to their normal angle in respect to the plane of the wheel ring element 23, and the inner apices 27 of the said star shaped elements 21 and 22 securely engage the central hub elements 24 at the structure adjacent the said annular groove 240 therein. The assembly of the wire wheel simulating wheel trim unit 20 is now completed, and it may be removed from the mandrel 32.

It will be observed that a die 330 shown in Fig. 20 may be substituted for the die 33; Fig. 20 being similar to Fig. 17. In such event, the die 33 contacts the spoke portions 210 of the star shaped spoke element 21 to accomplish the springing of the spoke elements 21 and 22 as required for assembling the several elements of wire wheel simulating wheel trim embodying the invention into an integral unit. Although not shown, the die 33 or 330, whichever may be employed, may be constructed of or lined with material that will not scratch the wheel ring element 23 or the spoke element 21 respectively.

Although but a single embodiment of the invention has been disclosed in detail and only a single series of method steps employed in manufacturing the same has been illustrated, it is obvious that many changes may be made in the size, shape, arrangement and details of the elements of the invention and that the method of manufacturing the same may be altered, all without departing from the spirit and scope of the invention as defined by the appended claims.

I claim:

1. Wire wheel simulating wheel trim comprising a star shaped spring wire spoke element having its inner apices disposed in one plane transverse to the axis of the element and its outer apices disposed in a second transverse plane, an outer ring element, and a hub element, said wire spoke element being sprung in firm interlocked relationship with said outer ring and hub elements.

2. In a wheel trim unit, an annular spring wire star shaped spoke element, an outer ring element, and an inner hub element, the outer and inner peripheries of said star shaped spoke element respectively engaging said outer ring and said hub element with a spring reaction against each of the them whereby to hold the several elements of said wheel trim unit firmly in assembled relationship.

3. Wire wheel simulating wheel trim comprising an annular ring element and a hub element, one of said elements having an inner edge and the other having a groove therein, and an annular spring wire spoke assembly including generally radially disposed spokes, said assembly being sprung into engagement with the said ring and hub elements with the assembly engaging over the inner edge one element and entering the groove of the other element.

4. Wire wheel simulating wheel trim comprising an annular ring element having an inner edge, a central hub element having an annular groove therein, and an annular spring wire spoke assembly including generally radially disposed spokes, said assembly being sprung into engagement with said ring and hub elements with the assembly engaging over the said inner edge of the ring element and within said groove of the hub element, the spring reaction of said spoke elements retaining all said elements in assembled relationship.

5. Wire wheel simulating wheel trim comprising an annular ring element having an inner edge, a central hub element having an annular groove therein, and an annular spring wire spoke element including generally radially disposed spokes sprung into engagement with the said ring and hub elements, the outer periphery of said wire spoke element being hooked over the inner edge of said ring element and the inner periphery of said spoke elements engaging the groove of said hub element, the spring reaction of said spoke elements retaining all said elements in assembled relationship.

6. Wire wheel simulating wheel trim comprising an annular ring element having an inner edge, a central hub element having an annular groove therein, an annular star shaped spring wire spoke element, hooks formed on the outer apices of the wire spoke element for engagement with the inner edge of said annular ring element, the said wire spoke element being sprung into engagement with said ring and hub elements with the outer periphery thereof hooked over the inner edge of the ring element and the inner periphery thereof engaging the annular groove of said hub element, the spring reaction of said spoke element retaining all of said elements in assembled relationship.

7. Wire wheel simultating wheel trim comprising an annular ring element having an inner edge, a central hub element having an annular groove therein, a pair of annular star shaped spring wire spoke elements disposed in juxtaposition with the apices thereof in staggered relationship, the outer apices of said annular spoke elements being disposed in one plane transverse to their axes and the inner apices thereof in another transverse plane, hooks formed on the outer apices of the wire spoke elements for engagement with said annular ring element, the said wire spoke elements being sprung into engagement with said ring and hub elements with the outer edge thereof hooked over the inner periphery of the ring element and the inner periphery thereof engaging the annular groove of said hub element, the spring reaction of said spoke elements retaining all of said elements in assembled relationship.

8. Wire wheel simultating wheel trim comprising an annular ring element and a hub element, one of which having an inner edge and the other having a groove therein, an annular star shaped spring wire spoke element, hooks formed on apices of the wire spoke element at one periphery thereof for engagement with the element having the inner edge, said wire spoke element being sprung into engagement with said other elements with the hooks thereof disposed over the element having the inner edge and the other periphery thereof engaging the groove of the element having said groove, the spring reaction of the spoke element retaining all of said elements in assembled relationship.

9. Wire wheel simultating wheel trim comprising an annular ring element and a hub element, one of which having an inner edge and the other having a groove therein, a pair of annular star shaped spring wire spoke elements disposed in juxtaposition with the apices thereof in staggered relationship, the outer apices of said pair of annular spoke elements being disposed in one plane and the inner apices thereof in another plane, hooks formed on apices of the wire spoke elements at one periphery thereof for engagement with the element having the inner edge, said wire spoke elements being sprung into engagement with said other elements with the hooked periphery thereof disposed over the element having the inner edge and the other periphery thereof engaging the groove of the element having said groove, the spring reaction of the spoke elements retaining all of said elements in assembled relationship.

10. The method of manufacturing wire wheel simulating wheel trim composed of an annular ring element, annular star shaped spring wire spoke elements having re-entrant hooks at the outer periphery thereof and a hub element having an annular groove therein comprising the placing of the annular star shaped wire spoke elements in overlapping spoke staggered relationship on a mandrel with the periphery of the mandrel disposed radially between the inner and outer peripheries of said annular spoke elements, placing the annular ring element onto said spoke elements and deflecting the outer periphery of the spoke elements simultaneously with snapping said ring element into engagement with said spoke elements at the re-entrant hooks thereof, further pressing said annular spoke elements onto a mandrel to increase the inner periphery thereof, placing said hub element onto the expanded inner periphery of said annular spoke elements with the said inner periphery thereof disposed in the groove in said hub element, and then releasing the pressure on said spring element to interlock the inner periphery of said annular spoke elements with said hub element.

11. Wire wheel simulating wheel trim comprising a ring element, a hub element, and a star-shaped spring wire endless spoke simulating annulus having its inner and outer peripheries lying in spaced planes at right angles to its axis, the apices at one of the peripheries of said annulus being formed to embrace an edge of one of said elements and the apices at the other of the peripheries of said annulus being sprung into interlocking engagement with the other element, the spring reaction of the said annulus retaining the said annulus and the other elements in assembled relationship.

12. In a simulated wire wheel trim, a pair of star-shaped endless wire rings laid together in face to face relationship in substantially the same conical plane with their points spaced apart equidistantly and crossing and engaging each other intermediate their points, a hub element secured to the inner points of said rings, an annular ring element overlying the outer points of said rings and being secured thereto, and said elements holding said rings in pressure contact with each other at their points of crossing engagement.

13. In a simulated wire wheel, a spoke-wire ring symmetrically offset around its center into a plurality of inwardly and outwardly extending points, said outwardly extending points being offset axially to define a peripheral trim-engaging bearing thereon, and an annular ring element having an inside diameter slightly less than the said peripheral bearing for snapping into engagement therewith.

14. The invention of claim 13, a hub element having an annular groove therein for receiving the inner points of said spoke-wire ring, said annular groove being slightly greater in diameter than the smallest circle common to the majority of said inwardly extending points, said latter points being snapped into engagement with said annular groove to place the spoke-wire under radial compression.

15. In a simulated wire wheel, an annular simulated wire spoke structure having inner and outer peripheries, an outer ring element mounted on the outer periphery of said annular structure and distorting the spoke structure by compressing its outer periphery, and an inner hub element mounted to the inner periphery of said annular structure and distorting the spoke structure by expanding its inner periphery, said spoke structure having its inner periphery displaced axially with respect to its outer periphery by said distortion as compared to its free state.

References Cited in the file of this patent

UNITED STATES PATENTS

| | | |
|---|---|---|
| 1,973,183 | Tarbox | Sept. 11, 1934 |
| 2,676,850 | McLeod | Apr. 27, 1954 |
| 2,699,360 | Jenkins | Jan. 11, 1955 |

FOREIGN PATENTS

| | | |
|---|---|---|
| 714,587 | France | Sept. 7, 1931 |

UNITED STATES PATENT OFFICE
CERTIFICATE OF CORRECTION

Patent No. 2,835,535                                    May 20, 1958

Edward L. Wood

It is hereby certified that error appears in the printed specification of the above numbered patent requiring correction and that the said Letters Patent should read as corrected below.

Column 1, line 68, for "spoke" read -- spokes --; column 4, line 37, for "elements" read -- element --; column 5, line 30, after "edge" insert -- of --; line 66, column 6, lines 8, and 21, for "simultating" read -- simulating --.

Signed and sealed this 22nd day of July 1958.

(SEAL)
Attest:

KARL H. AXLINE
Attesting Officer

ROBERT C. WATSON
Commissioner of Patents